(12) United States Patent
Feng et al.

(10) Patent No.: US 7,374,329 B2
(45) Date of Patent: May 20, 2008

(54) LIGHT GUIDE DEVICE AND A BACKLIGHT MODULE USING THE SAME

(75) Inventors: Di Feng, Beijing (CN); Ying-Bai Yan, Beijing (CN); Guo-Fan Jin, Beijing (CN); Shou-Shan Fan, Beijing (CN)

(73) Assignees: Tsinghua University, Haidian District, Beijing (CN); Hon Hai Precision Industry Co., Ltd., Tu-Chen, Taipei Hsien (TW)

( * ) Notice: Subject to any disclaimer, the term of this patent is extended or adjusted under 35 U.S.C. 154(b) by 0 days.

(21) Appl. No.: 11/267,065

(22) Filed: Nov. 4, 2005

(65) Prior Publication Data

US 2006/0104093 A1 May 18, 2006

(30) Foreign Application Priority Data

Nov. 18, 2004 (CN) .................. 2004 1 0052363

(51) Int. Cl.
*F21V 7/04* (2006.01)
(52) U.S. Cl. .................. 362/626; 362/608; 349/65
(58) Field of Classification Search ............ 362/626
See application file for complete search history.

(56) References Cited

U.S. PATENT DOCUMENTS

| | | | | |
|---|---|---|---|---|
| 4,811,507 A * | 3/1989 | Blanchet | ...................... | 40/546 |
| 5,128,842 A * | 7/1992 | Kenmochi | ................... | 362/95 |
| 5,237,641 A | 8/1993 | Jacobson et al. | | |
| 5,485,291 A * | 1/1996 | Qiao et al. | ...................... | 349/62 |
| 5,555,329 A | 9/1996 | Kuper et al. | | |
| 5,575,549 A * | 11/1996 | Ishikawa et al. | ............ | 362/625 |
| 5,584,556 A * | 12/1996 | Yokoyama et al. | ......... | 362/625 |
| 5,709,447 A * | 1/1998 | Murakami et al. | .......... | 362/621 |
| 5,718,497 A * | 2/1998 | Yokoyama et al. | ......... | 362/625 |
| 5,772,305 A * | 6/1998 | Ishikawa et al. | ............ | 362/621 |
| 5,779,337 A | 7/1998 | Saito et al. | | |
| 5,926,033 A * | 7/1999 | Saigo et al. | ................. | 362/600 |
| 5,999,685 A * | 12/1999 | Goto et al. | .................. | 385/146 |
| 6,155,692 A * | 12/2000 | Ohkawa | ..................... | 362/619 |
| 6,612,723 B2 * | 9/2003 | Futhey et al. | ................ | 362/339 |

(Continued)

FOREIGN PATENT DOCUMENTS

CN        1323069 A        11/2001

(Continued)

*Primary Examiner*—Hargobind S. Sawhney
(74) *Attorney, Agent, or Firm*—Morris Manning Martin LLP; Tim Tingkang Xia, Esq.

(57) ABSTRACT

A light guide device includes a main body having a first incident surface, a second incident surface, an emitting surface, a reflecting surface and a plurality of first microstructures. The first incident surface is opposite to the second incident surface. The emitting surface extends from the first incident surface to the second incident surface. The reflecting surface is opposite to the emitting surface, and the plurality of first microstructures are formed on the reflecting surface and extend parallel to the first and second incident surface. A distribution density and relative size of the first microstructures progressively decrease along directions from a center of the reflecting surface toward the first and second incident surface, respectively. The present light guide device does not employ additional optical correcting elements and thus has a simple structure. A backlight module using the same light guide device is also provided.

18 Claims, 8 Drawing Sheets

U.S. PATENT DOCUMENTS

| | | | |
|---|---|---|---|
| 6,633,722 B1* | 10/2003 | Kohara et al. | 385/146 |
| 6,854,857 B2* | 2/2005 | Hara et al. | 362/613 |
| 6,955,453 B2* | 10/2005 | Kunimochi et al. | 362/333 |
| 7,101,070 B2* | 9/2006 | Yu et al. | 362/558 |
| 7,134,778 B2* | 11/2006 | Kazuhiro et al. | 362/620 |
| 2003/0227768 A1 | 12/2003 | Hara et al. | |
| 2005/0099815 A1* | 5/2005 | Kim et al. | 362/339 |
| 2005/0174807 A1* | 8/2005 | Yu et al. | 362/626 |
| 2005/0180167 A1* | 8/2005 | Hoelen et al. | 362/613 |

FOREIGN PATENT DOCUMENTS

| | | |
|---|---|---|
| CN | 2516997 Y | 10/2002 |
| JP | 09-269421 | 10/1997 |

* cited by examiner

LIGHT GUIDE DEVICE AND A BACKLIGHT MODULE USING THE SAME

FIELD OF THE INVENTION

The present invention relates to light guide devices and backlight modules, and, more particularly, to an edge-lighting type light guide device and backlight module for use in, for example, a liquid crystal display (LCD).

BACKGROUND

In a liquid crystal display device, a liquid crystal is a substance that does not itself radiate light. Instead, the liquid crystal relies on light received from a light source, thereby displaying images and data. In the case of a typical liquid crystal display device, a backlight module powered by electricity supplies the needed light.

FIG. 12 (Prior art) represents a first typical backlight module 100. The backlight module 100 includes a light source 10, a light guide device 12, and a plurality of complementary optical elements 11, 13, and 14. The light guide device 12 includes an incident surface 122 facing the light source 10, an emitting surface 124 located at a top thereof, and a reflecting surface 126 opposite to the emitting surface 124. The complementary optical elements include a reflective sheet 11, a diffusion sheet 13, and a brightness enhancement sheet 14. The reflective sheet 11 is positioned under the light guide device 12 and is configured for reflecting light back into the light guide device 12. The diffusion sheet 13 is located above the light guide device 12 and is configured for uniformly diffusing the emitted light, thereby avoiding the occurrence of light spots on the emitting surface 124 of the light guide device 12. The brightness enhancement sheet 14 is positioned above the diffusion sheet 13 and is configured for collimating the emitted light, thereby improving the brightness of light illumination. However, due to employing these complementary optical elements, the backlight module is unduly complicated and therefore is costly to manufacture.

The light guide device 12 converts the linear light source 10 into a surface light source. However, the light guide device 12 by its very nature cannot control the emergence direction of the light emitted therefrom. FIG. 12 shows a typical light path 15 associated with the backlight module 100. A light beam 101 emitted from the light source 10 enters into the light guide device 12 through the incident surface 122 thereof. The light beam 101 is reflected at the reflecting surface 126 and then exits from the emitting surface 124. However, the light beam 101 emitting from such a light guide device 12 is generally not perpendicular to the emitting surface 124. Therefore, the complementary optical elements, such as the diffusion sheet 13 and the brightness enhancement sheet 14, have to be employed so as to direct the light beam to exit from the light guide device 12 in a direction that is perpendicular to the emitting surface 124.

A second conventional backlight module 30 which can restrain the light emitting angle within a certain range is shown in FIG. 13. The backlight module 30 includes a light source 31, a light guide device 32, and an array of prisms 33. The light guide device 32 has an incident surface 322, an emitting surface 324, and a bottom surface 326. The incident surface 322 is disposed adjacent the light source 31, the emitting surface 324 adjoins the incident surface 322, and the bottom surface 326 is opposite to the emitting surface 324.

The array of prisms 33 is formed on the emitting surface 324. Each prism 33 has an index of refraction higher than that of the light guide device 32. Each prism 33 has first, second, third, and fourth sides 334, 335, 336, 337. The first side 334 is brought into optical contact with the light guide device 32 at emitting surface 324. The fourth side 337 is opposite to the first side 334. The second and third sides 335, 336 adjoin the first and fourth sides 334, 337, respectively. Either of the second and third edges 335, 336 and the first side 334 cooperatively form an acute angle.

Upon being totally internally reflected, the light is directed to exit from the light guide device 32 and enters into the prisms 33 through the first side 334 thereof. The light is then reflected by the third side 336 of the prisms 33 and exits the prisms 33 through the fourth side 337 thereof as a spatially directed light source. However, even though light is successfully redirected by such a module 30, it is difficult to mass produce the light guide device 32 by way of a conventional mold injection method.

A third conventional light guide device 40 is shown in FIG. 14. The light guide device 40 includes a body 401 configured for guiding light transmitted from a tubular light source 41. The body 401 has a plurality of projections 422 arrayed on an emitting surface 42. The projections 422 are parallel to each other and extend parallel to a longitudinal direction of the tubular light source 41. A height of each of the projections 422 progressively increases from a central region thereof to the two opposite ends thereof.

However, the light guide device 40 has its drawbacks. The projections 422 of the light guide device 40 are unduly complicated in structure and therefore are costly to manufacture. In particular, the light guide device 40 cannot be easily/readily mass-produced by way of injection molding. Furthermore, the light guide device 40 cannot control the emitting light beams in a manner so as ensure that the beams exit perpendicularly from the emitting surface 42 of the light guide device 40. Therefore, the light guide device 40 generally still needs to employ additional optical correcting elements in order to redirect the light beams coming from the emitting surface 42 of the light guide device 40.

A fourth conventional backlight module 50 which can control the light emitting angle is shown in FIG. 15 and FIG. 16. The backlight module 50 includes a light source 51 and a wedge shaped light guide plate 52. The light guide plate 52 includes a multi-layer structure 53 formed on a bottom surface thereof. The multi-layer structure 53 includes a plurality of layers with an outmost layer having a plurality of projections 54. The layers each have different respective indices of refraction. However, as such, the multi-layer structure of the light guide plate 52 is unduly complicated in structure and therefore is costly to manufacture.

What is needed, therefore, is a light guide device which can control a plurality of emitting light beams to emit uniformly and substantially perpendicular to an emitting surface thereof and which can realize the function of a conventional backlight module without the aid of additional optical elements.

SUMMARY

The present display device provides a light guide device. A preferred embodiment of the light guide device includes a main body having a first incident surface, a second incident surface, an emitting surface, a reflecting surface, and a plurality of first microstructures. The first incident surface is opposite to the second incident surface. The emitting surface extends from the first incident surface to the second incident surface. The reflecting surface is opposite to the emitting surface, and the plurality of first microstructures is formed on the reflecting surface. The first microstructures each extend parallel to the first and second incident surfaces. A distribution density and a relative size of the first microstructures progressively decrease along directions from a center of the reflecting surface toward the first and second incident surfaces, respectively.

The light guide device may further include a plurality of second microstructures formed on the emitting surface thereof, the second microstructures being oriented in a direction essentially perpendicular to the incident surface.

The light guide device may further include a plurality of third microstructures formed on the first and second incident surface thereof, the third microstructures being oriented in a direction perpendicular to the reflecting surface.

The light guide device may yet further include a highly reflectivity film formed on the exterior of the first microstructures and on the intermediate reflective surface portions of the main body.

The present display device also provides a backlight module using the same light guide device. A preferred embodiment of the backlight module includes two spaced light sources and a light guide device interposed between the light sources. The light guide device has a main body including a first incident surface, a second incident surface, an emitting surface, a reflecting surface, and a plurality of first microstructures. The first incident surface is disposed adjacent to one of the two light sources. The second incident surface is opposite to the first incident surface and disposed adjacent to the other light source. The emitting surface extends from the first incident surface to the second incident surface. The reflecting surface is opposite to the emitting surface, and a plurality of first microstructures is formed on the reflecting surface. The first microstructures each extend parallel to the first and second incident surface. A distribution density and a relative size of the first microstructures each progressively decrease along directions from a center of the reflecting surface toward the first and second incident surface.

Compared with conventional light guide devices, the present light guide device has a plurality of first V-shaped microstructures on the reflecting surface thereof. The distribution density and sizes of such V-shaped microstructures enable the light guide devices to control the emitting light beams so as to emanate uniformly and substantially perpendicular to an emitting surface thereof. The present light guide devices do not need a plurality of additional optical elements and thus have a relatively simple structure. In addition, the second V-shaped microstructures can restrain light emitting angles and can promote the collimating of the emitted light; and the third V-shaped microstructures can help eliminate a plurality of dark areas from being formed adjacent to the incident surface. Furthermore, the high reflectivity film can improve the utilization efficiency of the light energy within the light guide device. Therefore, the light guide device can be advantageously applied in a backlight module of a liquid crystal display device.

Other advantages and novel features will become more apparent from the following detailed description of preferred embodiments when taken in conjunction with the accompanying drawings.

BRIEF DESCRIPTION OF THE DRAWINGS

Many aspects of the present light guide device can be better understood with reference to the following drawings. The components in the drawings are not necessarily to scale, the emphasis instead being placed upon clearly illustrating the principles of the present device. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present backlight module, in detail.

Figure 1:
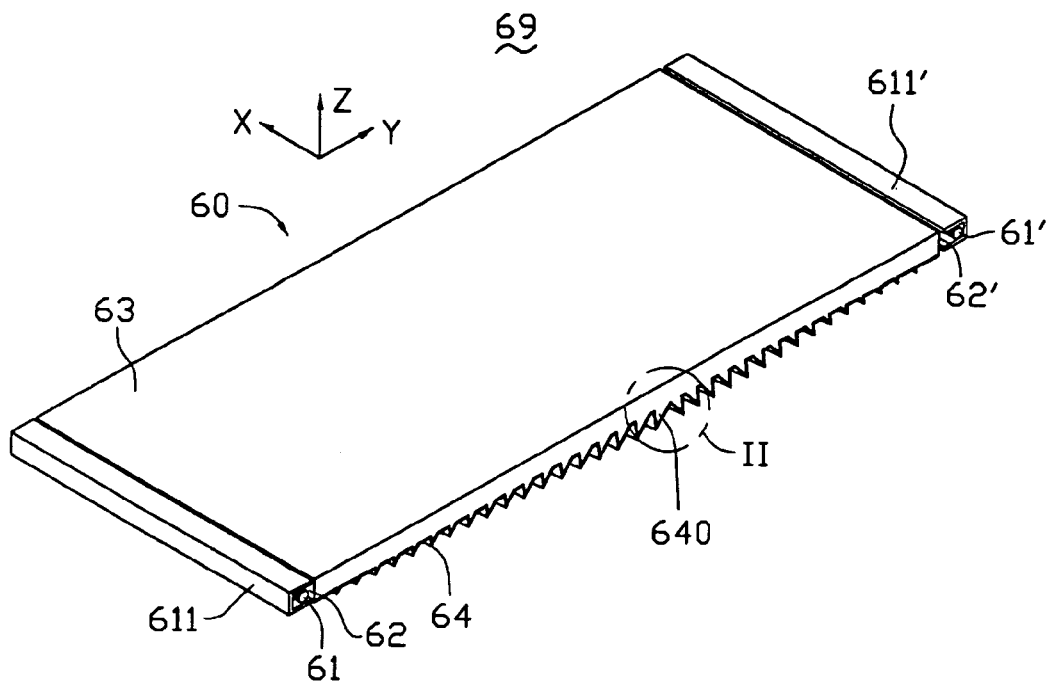
FIG. 1 is a schematic, perspective view of a backlight module, according to a first preferred embodiment.

Referring to FIG. 1, a backlight module 69, in accordance with a first preferred embodiment, is shown. The backlight module 69 includes a light guide device 60, two cold cathode fluorescent lamps (CCFL) 61, 61', and two reflectors 611, 611'. The light guide device 60 is generally a flat sheet which includes a first incident surface 62, a second incident surface 62', an emitting surface 63, a reflecting surface 64 and a plurality of first microstructures 640. The first incident surface 62 is opposite to the second incident surface 62'. The emitting surface 63 is located at a top of the light guide device 60 and extends from the first incident surface 62 to the second incident surface 62'. The reflecting surface 64 is opposite to the emitting surface 63, and the plurality of first microstructures 640 are formed at/upon the reflecting surface 64 and are arranged parallel to the first and second incident surfaces 62, 62'.

The CCFLS 61, 61' are respectively disposed adjacent the first and second incident surfaces 62, 62' of the light guide device 60. The reflectors 611, 611' partly surround the two CCFLS 61, 61', respectively. The CCFLS 61, 61' each can be substituted with at least one light emitting diode (LED) or another light-generating element/device.

Figure 2:
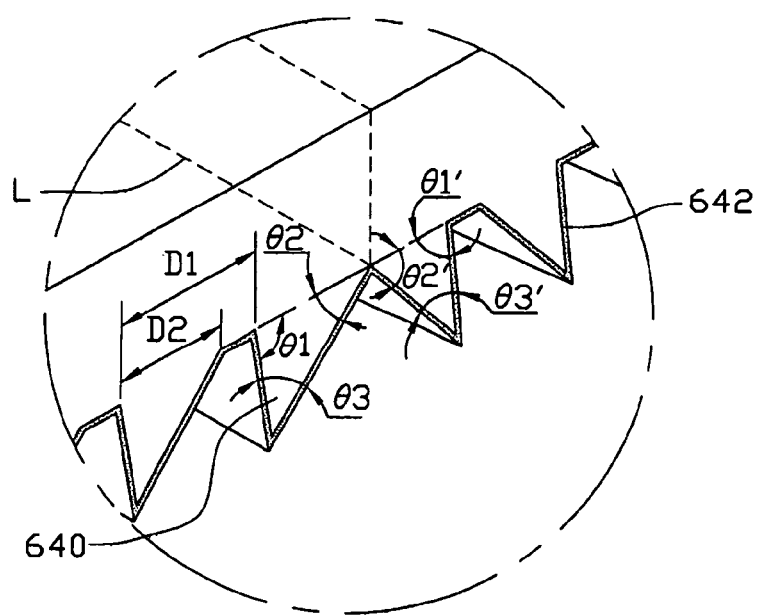
FIG. 2 is an enlarged view of a circled portion II of FIG. 1.

Referring also FIG. 2, the first microstructures 640 are symmetrically arranged on the reflecting surface 64 with respect to a middle line L of the reflecting surface 64. A pitch D1 between adjacent first microstructures 640 is configured to be constant. Further, the pitch D1 is configured to be greater than or equal to a greatest/largest base width D2 of each of the first microstructures 640. The first microstructures 640 located between the first incident surface 62 and the middle line L are configured in a manner such that base widths of the microstructures 640 progressively increase along a direction away from the first incident surface 62. Additionally, a distribution density and relative size of the first microstructures 640 progressively increase along the direction from the first incident surface 62. The first microstructures 640 located between the middle line L and the second incident surface 62' are configured in a manner so that base widths of the microstructures 640 progressively decrease along a direction away from the middle line L. In a similar manner, a distribution density and relative size of the first microstructures 640 progressively decrease along the direction away from the middle line L.

The first microstructures 640 each extend along the X-direction and are configured to be parallel (or at least essentially parallel) to each other. The first microstructures 640 are also aligned parallel (or at least essentially so) to the first and second incident surfaces 62, 62'. The first microstructures 640 have a similar shape but different sizes. Each of the first microstructures 640 is an elongate V-shaped projection having a uniform height along the length thereof. Each of the first microstructures 640 has a triangular cross-section. The triangular cross-section includes a first base angle $\theta 1$, a second base angle $\theta 2$, and a vertex angle $\theta 3$. The first base angle $f1$ is configured to be about in the range from 70 to 90 degrees, the second base angle $\theta 2$ is configured to be in the approximate range from 15 to 50 degrees, and the vertex angle $\theta 3$ is configured to be in the range of about from 40 to 95 degrees. In the first preferred embodiment, the first base angle $\theta 1$ is 82 degrees, the second base angle $\theta 2$ is 36 degrees, and the vertex angle $\theta 3$ is 62 degrees.

The base width D2 of each of the first microstructure 640 is configured to be about in the range from 10 to 300 micrometers. Even more advantageously, the width D2 is configured to be about 10 micrometers or less. If the width D2 of each of the first microstructures 640 were configured to be, for example, less than 10 micrometers, the first microstructures 640 would therefore not be readily discernible to the naked eye. Therefore, there would be no need to employ an additional diffusion sheet, assembled to the backlight module 69. This configuration (i.e., D2<~10 μm) thus would save energy and reduce costs.

By the selective choice of the angles $\theta 1$, $\theta 2$, $\theta 3$ of the triangular cross-section of each of the first microstructures 640, the light beams can thereby exit perpendicularly (or at least essentially so) from the emitting surface 63. If the emitting light intensity of part of the light guide device 60 were to be unduly high, the distribution density and sizes of the microstructures 640 could be decreased accordingly so as to improve the uniformity of the emitting light intensity. On the contrary, if the emitting light intensity of part of the light guide device 60 should prove unduly low, the distribution density and sizes of the microstructures 640 could instead be increased.

In order to improve the utilization efficiency of light energy, a high reflectivity film 642 may be formed on be formed on the exterior of the first microstructures 640 and on the intermediate reflective surface portions of the light guide device 60 (see FIG. 2) (or on at least one of the first microstructures 640 and/or on at least one intermediate reflective surface portion). In order to further improve utilization efficiency of light energy, a high reflectivity film 642 may also be formed on other two sidewalls of the light guide device 60 other than the first and second incident surface 62, 62'. The high reflectivity film 642 may be a metal film such as an aluminum film, silver film and so on, or a dielectric film having high reflectivity characteristics.

Figure 3:
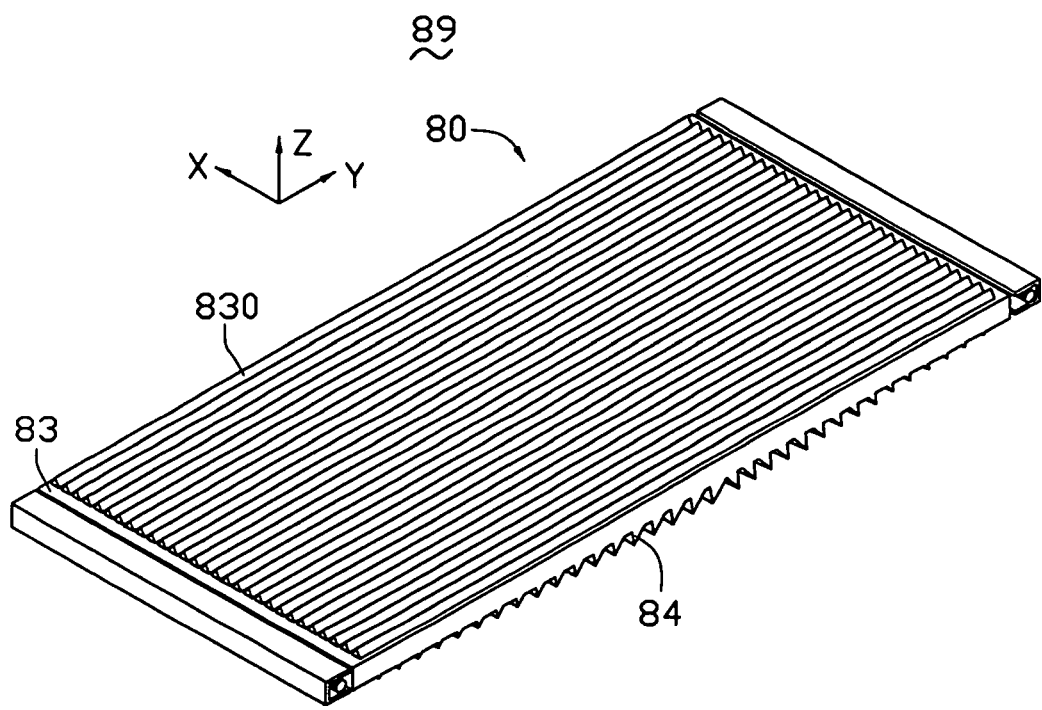
FIG. 3 is a schematic, perspective view of a backlight module, according to a second preferred embodiment.

In order to restrain light emitting angles and to promote collimating of the emitting/exiting light, additional microstructures may advantageously be formed on the emitting surface of the light guide device (as shown and described in relation to FIG. 3).

Referring to FIG. 3, a backlight module 89 in accordance with a second preferred embodiment is similar to that of the first embodiment, except that a light guide device 80 of the backlight module 89 further includes a plurality of second microstructures 830 formed on an emitting surface 83 thereof. The second microstructures 830 extend outwardly from the emitting surface 83. The second microstructures 830 are arranged regularly and periodically along the X-axis direction (thereby extending essentially perpendicular to the first microstructures 84). The plurality of the second microstructures 830 may be configured to be contiguous or discrete. The second microstructures 830 advantageously have a same height and a same size. Each of the second microstructures 830 usefully has an isosceles triangular cross-section, taken along the X-axis. The isosceles triangular cross-section of the second microstructures 830 has a vertex angle. The vertex angle is configured to be approximately in the range from 50 to 150 degrees. A measurable height of the isosceles triangular cross-section is configured to be in the range from above about 0 to about 500 micrometers. (A height of some fraction of a micrometer is considered to be within the scope of that range.) In the illustrated embodiment, the vertex angle is configured to be 90 degrees (or at least nearly so). A pitch between adjacent second microstructures 830 is configured to be about 0.2 micrometers.

In another exemplary embodiment, the backlight module may employ a plurality of LEDS as a light source. An intensity of incident light produced adjacent the incident surface is generally non-uniform, and a plurality of dark areas may therefore be formed adjacent/proximate the incident surface. In order to solve this problem, a light guide device 90 (FIG. 4) in accordance with a third preferred embodiment is provided.

Figure 4:
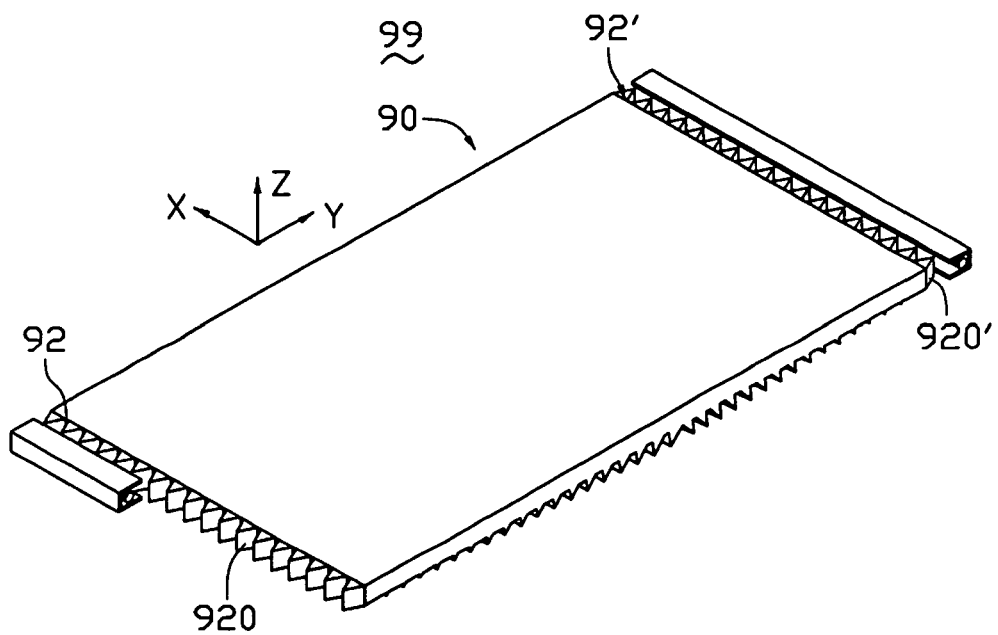
FIG. 4 is a schematic, perspective view of backlight module, according to a third preferred embodiment.

Referring to FIG. 4, a backlight module 99, in accordance with a third preferred embodiment, is similar to that of the first embodiment, except that an LED light source 94, incorporating a plurality of LEDS, is used as a light source. In addition, the light guide device 90 further includes a plurality of third microstructures 920, 920', respectively, formed on first and second incident surfaces 92, 92' thereof. The third microstructures 920, 920' extend outwardly from the first and second incident surfaces 92, 92'. The third microstructures 920, 920' are arranged regularly and periodically along the Z-axis direction.

Each of the third microstructures 920, 920' advantageously has a same height and a same size. Each of the third microstructures 920, 920' usefully has an isosceles triangular cross-section, when viewed via the Z-direction. The isosceles triangular cross-section of each of the third microstructures 920, 920' has a vertex angle. The vertex angle is configured to be in the range from 50 to 150 degrees, and the height is in the range from above about 0 to about 500 micrometers (a fractional amount of a micrometer is considered to be within the scope of this range). Preferably, the vertex angle is configured to be about 120 degrees, while a pitch between adjacent third microstructures 920, 920' is configured to be about 1 micrometer. It is to be understood that use of only one such set of third microstructures 920, 920' (e.g., only one LED light source 94 is employed as one of the two light sets) would be within the scope of the present device.

Figure 5A:
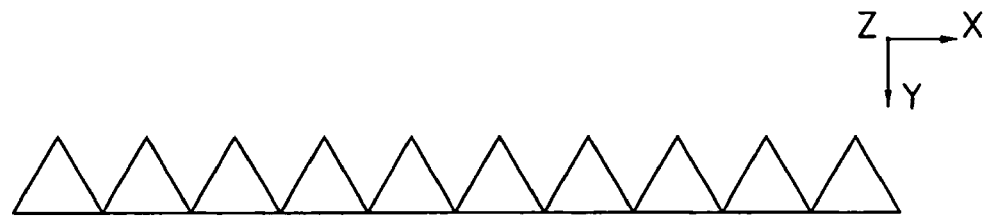
FIGS. 5A, 5B show two exemplary configurations of third microstructures formed on a incident surface of a light guide device of the present backlight module.
Figure 5B:
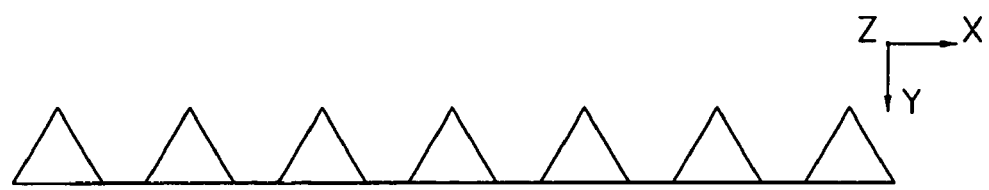

A plurality of the third microstructures may be advantageously formed on the incident surface of the light guide device 90. Referring to FIGS. 5A, 5B, the third V-shaped microstructures 920, 920' of the light guide device 90 may be configured to be either contiguous (FIG. 5A) or discrete (FIG. 5B).

Figure 6:
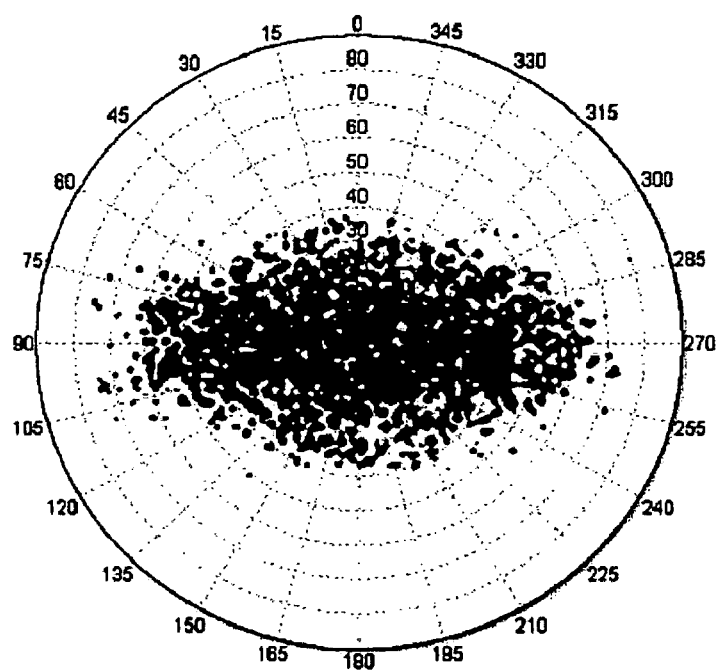
FIG. 6 is a graph showing a distribution of light emitting angles for the backlight module of FIG. 1.

FIG. 6 shows a graph illustrating a distribution of light emitting angles for the backlight module 69, in accordance with the first preferred embodiment of FIG. 1. Apparently, the emitting light is mainly located in a middle portion of the graph of FIG. 6. Accordingly, this graph indicates that the emitting light beams exit predominantly from the light guide device 60 in a direction perpendicular to the emitting surface 63 thereof.

Figure 7:
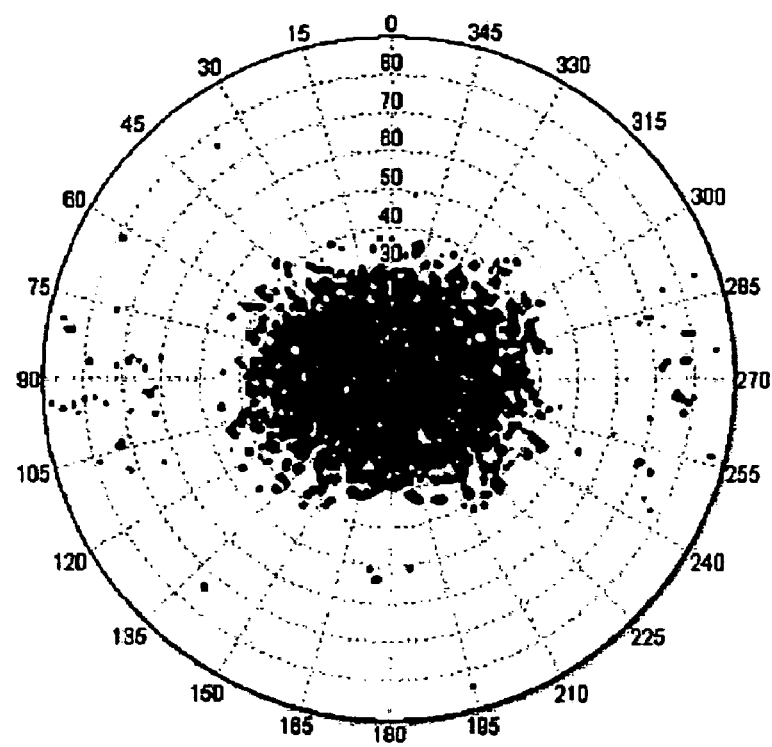
FIG. 7 is a graph showing a distribution of light emitting angles for the backlight module of FIG. 3.

FIG. 7 shows a graph illustrating a distribution of light emitting angles for the backlight module 89, in accordance with the second preferred embodiment. The emitting light is mainly located in a center of the graph of FIG. 7. Compared to the backlight module 69 of the first embodiment, the backlight module 89 of second embodiment appears to more effectively restrain the light emitting angles and thereby promote collimating of the emitting/emanating light beams.

Figure 8:
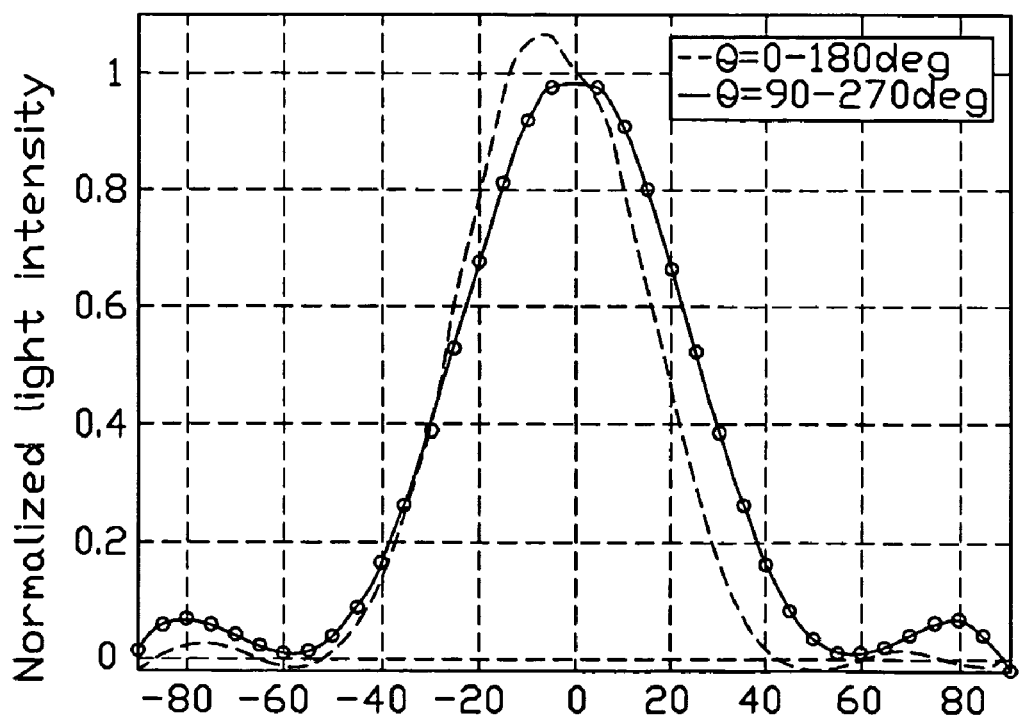
FIG. 8 is a light emitting angle—normalized light intensity graph for the backlight module of FIG. 3.

FIG. 8 shows a graph of light emitting angles (based on normalized light intensity) in two directions of 0 and 90 degrees of the light emitting angles, in accordance with the backlight module 89 of FIG. 3. It shows that the light intensity is unduly high when the light emitting angle is in the range from 0 to 30 degrees. Most part of emitting light beams exit from the light guide device in a direction essentially perpendicular to the emitting surface of the light guide device. Therefore, the present light guide device can realize the function of an operational backlight module without the aid of additional optical correcting elements.

Figure 9:
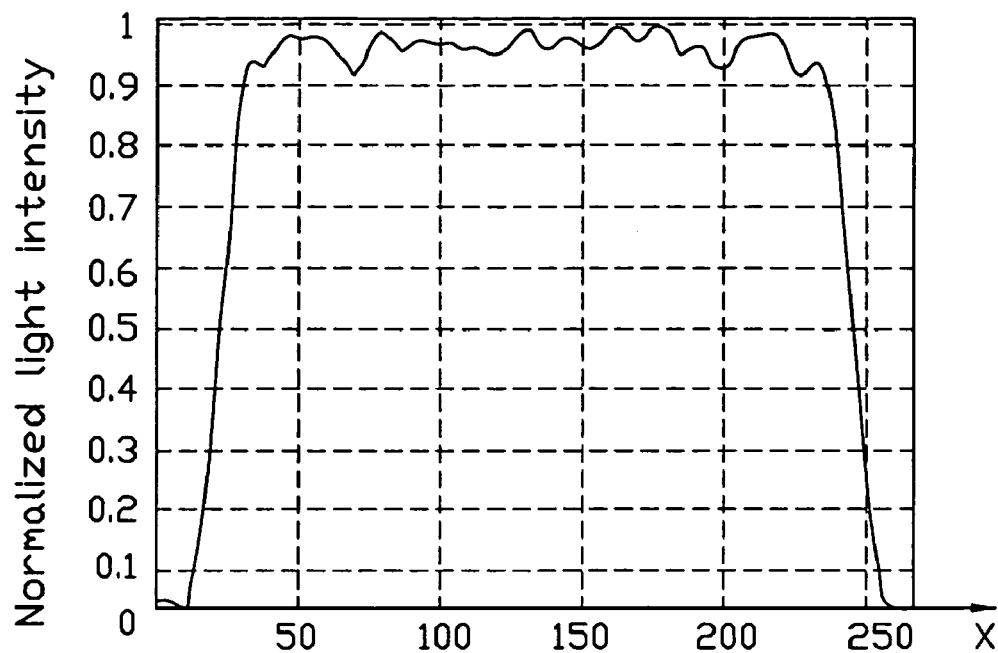
FIG. 9 is a graph showing a distribution of normalized light intensity of emitting light in the X-axis direction for the backlight module of FIG. 3.
Figure 10:
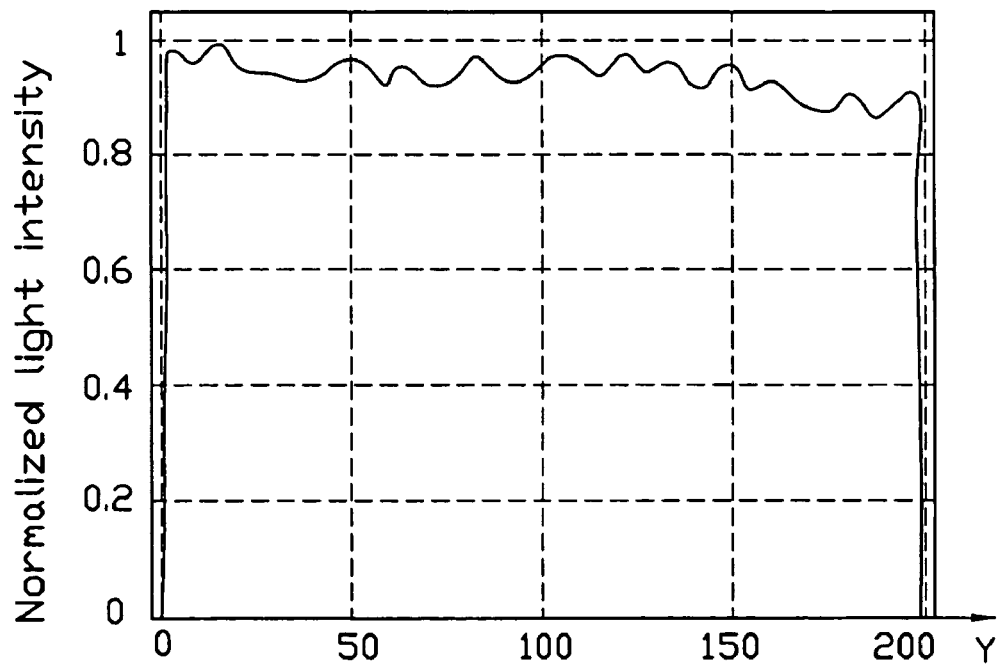
FIG. 10 is a graph showing a distribution of normalized light intensity of emitting light in the Y-axis direction for the backlight module of FIG. 3.

FIG. 9 shows a graph of normalized light intensity of emitting light versus X-direction position for the backlight module 89 of FIG. 3. FIG. 10 shows a graph of normalized light intensity of emitting light versus Y-direction position for the backlight module 89 of FIG. 3. Apparently, the light intensity of the two directions has a good uniformity and keeps the light intensity uniformly over 85 percent.

Figure 11:
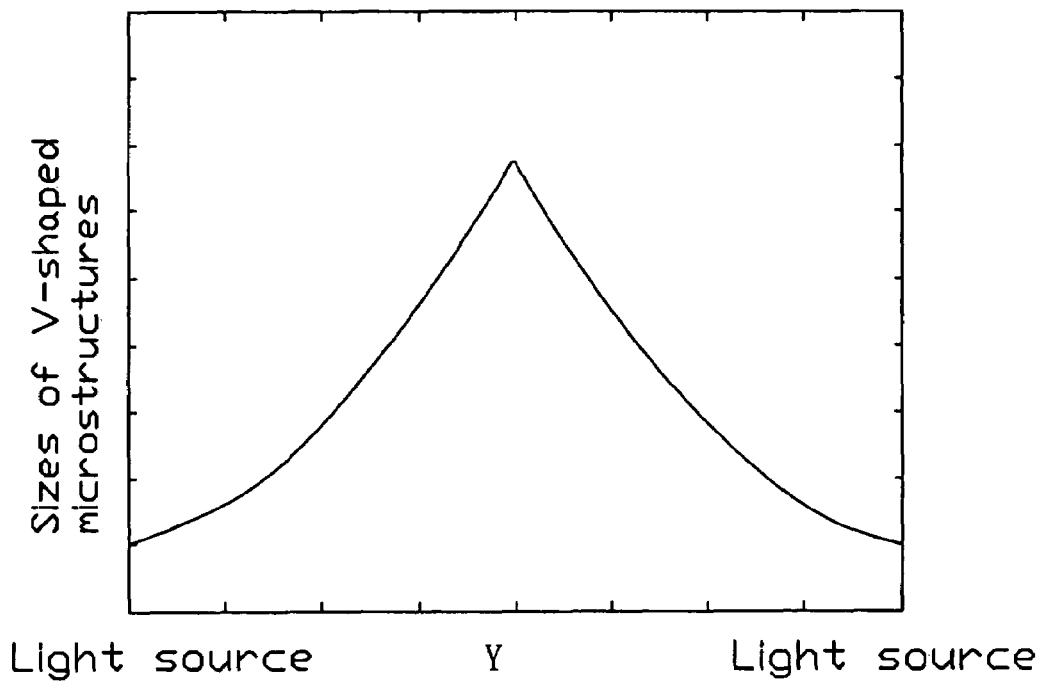
FIG. 11 is a graph showing a size distribution of microstructures provided on a reflecting surface of a present light guide device, along the Y-axis direction.
Figure 12:
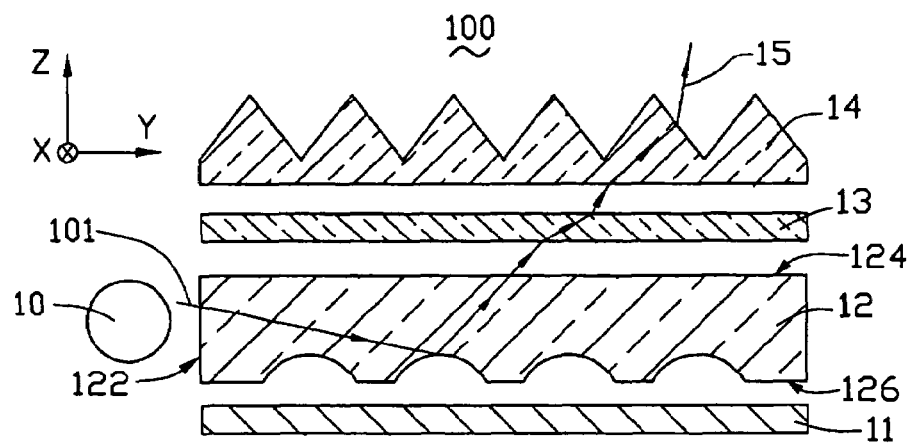
FIG. 12 is a schematic, exploded, cross-sectional view of a first conventional backlight module.
Figure 13:
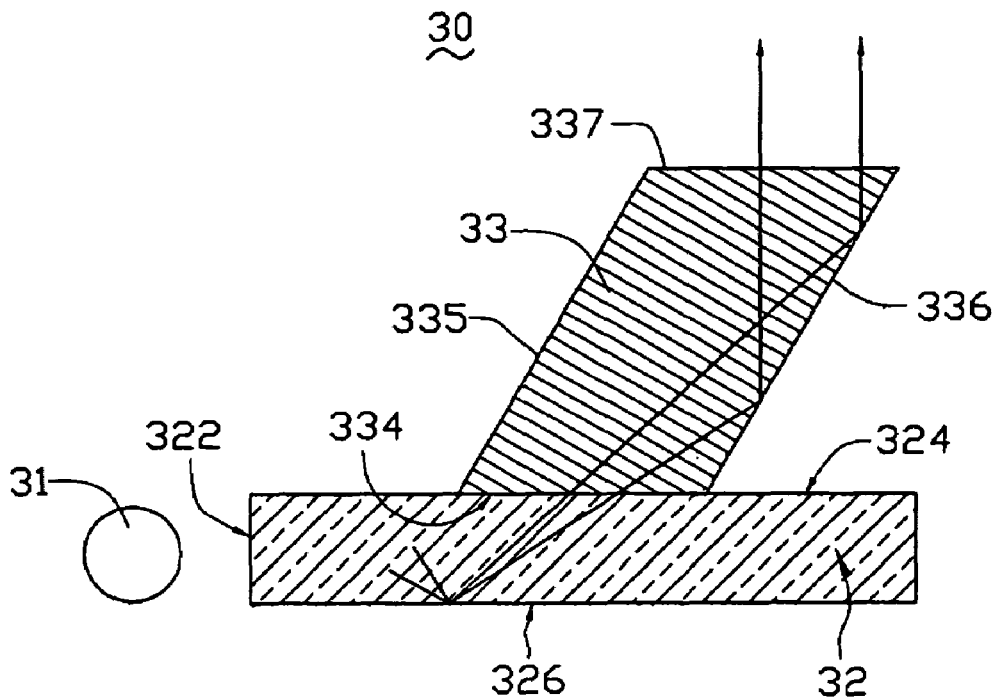
FIG. 13 is a schematic, cross-sectional view of a second conventional backlight module.
Figure 14:
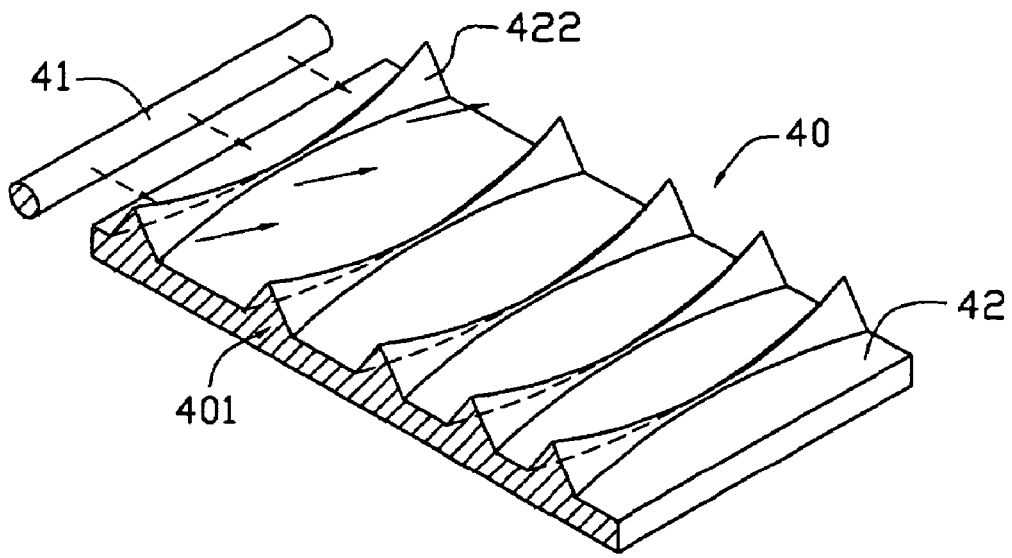
FIG. 14 is an isometric view of a third conventional backlight module.
Figure 15:
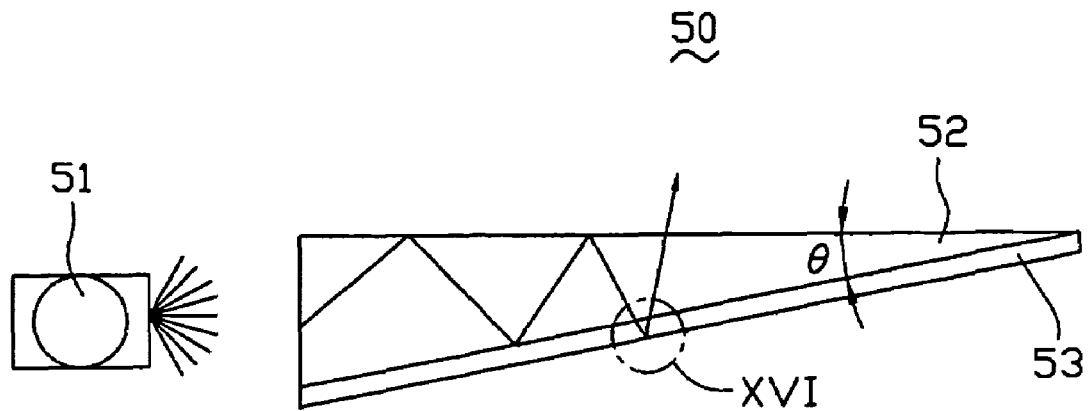
FIG. 15 is a schematic, cross-sectional view of a fourth conventional backlight module.
Figure 16:
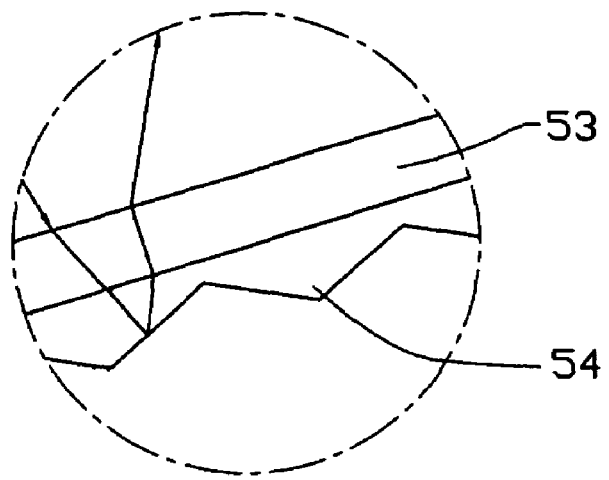
FIG. 16 is an enlarged view of a circled portion XVI of FIG. 15.

The microstructures 640, 830, 920, 920' of the present light guide device may be configured/chosen based on the composition material for such microstructures and/or based on the size of the light guide device. For instance, referring to FIG. 11, the sizes of the first microstructures are progressively decreased along directions away from a middle line L of the reflecting surface. A distribution density of the first microstructures 640 may advantageously be configured to be non-linear.

The overall shape of the light guide device may be configured to be flat or wedge-shaped. The light guide device may be comprised of a material selected from polymethyl methacrylate (PMMA), polycarbonate (PC), and/or other suitable transparent resin materials.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A light guide device, comprising:
    a main body, including:
    a first incident surface;
    a second opposite incident surface;
    an emitting surface extending from the first incident surface to the second incident surface;
    a reflecting surface opposite from the emitting surface; and
    a plurality of first microstructures formed on the reflecting surface, each first microstructure extending parallel to the first and second incident surfaces, the first microstructures having a distribution density and a relative size, the distribution density and the relative size progressively decreasing along directions from a center of the reflecting surface toward the first and second incident surfaces, respectively, wherein each of the first microstructures comprises a triangular cross-section having a first base angle that is approximately in the range from 70 to 90 degrees, a second base angle that is approximately in the range from 15 to 50 degrees, and a vertex angle that is approximately in the range from 40 to 95 degrees.

2. The light guide device according to claim 1, wherein each of the first microstructures has a same height as the other first microstructures.

3. The light guide device according to claim 1, wherein a base width of each of the first microstructures is approximately in the range from 10 to 300 micrometers.

4. The light guide device according to claim 1, further comprising a plurality of second microstructures formed on the emitting surface, the second microstructures being oriented in a direction essentially perpendicular to the incident surface.

5. The light guide device according to claim 4, wherein each of the second microstructures has at least one of the following characteristics:
    a given second microstructure has a triangular cross-section having a vertex angle that is approximately in the range from 50 to 150 degrees; and
    a given second microstructure has a height in the range from above 0 to approximately 500 micrometers.

6. The light guide device according to claim 1, further comprising a plurality of third microstructures formed on at least one of the first and second incident surfaces, the third microstructures being oriented in a direction perpendicular to the reflecting surface.

7. The light guide device according to claim 6, wherein each of the third microstructures has at least one of the following characteristics:
    a given third microstructure has a triangular cross-section having a vertex angle that is approximately in the range from 50 to 150 degrees; and
    a given third microstructure has a height in the range from above 0 to approximately 500 micrometers.

8. The light guide device according to claim 1, further comprising a high reflectivity film formed on the exterior of at least one first microstructure and on at least one intermediate reflective surface portion of the main body.

9. The light guide device according to claim 8, wherein the high reflectivity film is one of a metal film and a dielectric film.

10. The light guide device according to claim 9, wherein the high reflectivity film is a metal film, the metal film being one of an aluminum film and a silver film.

11. The light guide device according to claim 1, further comprising two sidewalls with a high reflectivity film formed on each of the two sidewalls.

12. The light guide device according to claim 1, wherein the shape of the light guide device is one of a flat sheet and a wedge-shaped body.

13. The light guide device according to claim 1, wherein the light guide device is comprised of material selected from the group consisting of polymethyl methacrylate, polycarbonate, and any combination thereof.

14. A backlight module comprising:
two spaced light sources, and
a light guide device interposed between the light sources, the light guide device having a main body including:
a first incident surface disposed adjacent one of the two light sources;
a second opposite incident surface disposed adjacent to the other light source;
an emitting surface extending from the first incident surface to the second incident surface;
a reflecting surface opposite from the emitting surface; and
a plurality of first microstructures formed on the reflecting surface, each first microstructure extending parallel to the first and second incident surfaces, the first microstructures having a distribution density and a relative size, the distribution density and the relative size progressively decreasing along directions from a center of the reflecting surface toward the first and second incident surfaces, respectively, wherein each of the first microstructures comprises a triangular cross-section having a first base angle that is approximately in the range from 70 to 90 degrees, a second base angle that is approximately in the range from 15 to 50 degrees, and a vertex angle that is approximately in the range from 40 to 95 degrees.

15. The backlight module according to claim 14, wherein the two light sources each comprise one of at least one light emitting diode and a cold cathode fluorescent lamp.

16. The backlight module according to claim 14, further comprising two reflectors each partly surrounding the corresponding light source.

17. The backlight module according to claim 14, further comprising a plurality of second microstructures formed on the emitting surface of the light guide device, the second microstructures being oriented in a direction essentially perpendicular to the incident surface of the light guide device.

18. The backlight module according to claim 14, further comprising a plurality of third microstructures formed on the incident surface of the light guide device, the third microstructures being oriented in a direction perpendicular to the reflecting surface of the light guide device.

* * * * *